US011092810B2

United States Patent
Danziger et al.

(10) Patent No.: US 11,092,810 B2
(45) Date of Patent: Aug. 17, 2021

(54) OPTICAL APERTURE EXPANSION ARRANGEMENT FOR NEAR-EYE DISPLAYS

(71) Applicant: Lumus Ltd., Ness Ziona (IL)

(72) Inventors: Yochay Danziger, Kfar Vradim (IL); Jonathan Gelberg, Modiin (IL)

(73) Assignee: Lumus Ltd., Ness Ziona (IL)

(*) Notice: Subject to any disclaimer, the term of this patent is extended or adjusted under 35 U.S.C. 154(b) by 0 days.

(21) Appl. No.: 16/765,485

(22) PCT Filed: Nov. 21, 2018

(86) PCT No.: PCT/IB2018/059165
§ 371 (c)(1),
(2) Date: May 20, 2020

(87) PCT Pub. No.: WO2019/102366
PCT Pub. Date: May 31, 2019

(65) Prior Publication Data
US 2020/0292819 A1   Sep. 17, 2020

Related U.S. Application Data

(60) Provisional application No. 62/588,946, filed on Nov. 21, 2017.

(51) Int. Cl.
*G02B 27/01*   (2006.01)
*F21V 8/00*    (2006.01)

(52) U.S. Cl.
CPC ....... *G02B 27/0172* (2013.01); *G02B 6/0018* (2013.01); *G02B 6/0028* (2013.01); *G02B 6/0076* (2013.01); *G02B 2027/0123* (2013.01)

(58) Field of Classification Search
None
See application file for complete search history.

(56) References Cited

U.S. PATENT DOCUMENTS

| | | |
|---|---|---|
| 5,712,694 A | 1/1998 | Taira et al. |
| 6,239,092 B1 | 5/2001 | Papasso et al. |
| 6,577,411 B1 | 6/2003 | David |
| 6,580,529 B1 | 6/2003 | Amitai et al. |
| 6,671,100 B1 | 12/2003 | McRuer |
| 6,829,095 B2 | 12/2004 | Amitai |
| 7,021,777 B2 | 4/2006 | Amitai |
| 7,205,960 B2 | 4/2007 | David |
| 7,339,742 B2 | 3/2008 | Amitai et al. |
| 7,391,573 B2 | 6/2008 | Amitai |

(Continued)

FOREIGN PATENT DOCUMENTS

| | | |
|---|---|---|
| CN | 104503087 | 4/2015 |
| CN | 103293650 | 6/2016 |

*Primary Examiner* — Jerry Rahll
(74) *Attorney, Agent, or Firm* — Mark M. Friedman

(57) ABSTRACT

An optical aperture expansion arrangement particularly useful for near-eye displays employs a waveguide (30, 140, 145) with wedge configurations (25, 26) to generate two modes of propagation of image illumination along the waveguide, and to couple out both modes from the waveguide. Various embodiments employ rectangular waveguides within which the image illumination propagates by four-fold internal reflection. In some cases, the wedge configurations are combined with an array of partially-reflective internal surfaces (45, 150) to achieve two-dimensional aperture expansion.

17 Claims, 7 Drawing Sheets

(56) References Cited

U.S. PATENT DOCUMENTS

| | | |
|---|---|---|
| 7,418,170 B2 | 8/2008 | Danziger |
| 7,457,040 B2 | 11/2008 | Amitai |
| 7,576,916 B2 | 8/2009 | Amitai |
| 7,577,326 B2 | 8/2009 | Amitai |
| 7,643,214 B2 | 1/2010 | Amitai |
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitai |
| 7,884,985 B2 | 2/2011 | Amitai et al. |
| 8,000,020 B2 | 8/2011 | Amitai |
| 8,004,765 B2 | 8/2011 | Amitai |
| 8,098,439 B2 | 1/2012 | Amitai et al. |
| 8,187,481 B1 | 5/2012 | Hobbs |
| 8,405,573 B2 | 3/2013 | Lapidot et al. |
| 8,432,614 B2 | 4/2013 | Amitai |
| 8,643,948 B2 | 2/2014 | Amitai et al. |
| 8,810,914 B2 | 8/2014 | Amitai et al. |
| 8,861,081 B2 | 10/2014 | Amitai et al. |
| 8,902,503 B2 | 12/2014 | Amitai et al. |
| 8,903,207 B1 | 12/2014 | Brown |
| 8,913,865 B1 | 12/2014 | Bennett |
| 9,025,253 B2 | 5/2015 | Hadad et al. |
| 9,069,180 B2 | 6/2015 | Amitai et al. |
| 9,104,038 B2 | 8/2015 | Amitai et al. |
| 9,207,457 B2 | 12/2015 | Amitai |
| 9,248,616 B2 | 2/2016 | Amitai |
| 9,279,986 B2 | 3/2016 | Amitai |
| 9,310,559 B2 | 4/2016 | Macnamara |
| 9,316,832 B2 | 4/2016 | Amitai et al. |
| 9,417,453 B2 | 8/2016 | Amitai et al. |
| 9,448,408 B2 | 9/2016 | Amitai et al. |
| 9,500,869 B2 | 11/2016 | Amitai |
| 9,551,880 B2 | 1/2017 | Amitai |
| 9,568,738 B2 | 2/2017 | Mansharof et al. |
| 9,671,566 B2 | 6/2017 | Abovitz et al. |
| 9,709,809 B2 | 7/2017 | Miyawaki et al. |
| 9,740,013 B2 | 8/2017 | Amitai et al. |
| 9,791,703 B1 | 10/2017 | Vallius |
| 9,804,396 B2 | 10/2017 | Amitai |
| 9,910,283 B2 | 3/2018 | Amitai |
| 10,048,499 B2 | 8/2018 | Amitai |
| 10,222,535 B2 | 3/2019 | Remhof et al. |
| 10,261,321 B2 | 4/2019 | Amitai |
| 10,302,835 B2 | 5/2019 | Danziger |
| 10,302,957 B2 | 5/2019 | Sissom |
| 2003/0165017 A1 | 9/2003 | Amitai |
| 2005/0024849 A1 | 2/2005 | Parker et al. |
| 2005/0180687 A1 | 8/2005 | Amitai et al. |
| 2008/0025667 A1 | 1/2008 | Amitai |
| 2008/0106775 A1 | 5/2008 | Amitai et al. |
| 2008/0151375 A1 | 6/2008 | Lin |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2010/0067110 A1 | 3/2010 | Yaakov et al. |
| 2010/0171680 A1 | 7/2010 | Lapidot et al. |
| 2010/0202128 A1 | 8/2010 | Saccomanno |
| 2010/0214635 A1 | 8/2010 | Sasaki et al. |
| 2010/0291489 A1 | 11/2010 | Moskovits et al. |
| 2011/0096566 A1 | 4/2011 | Tsai et al. |
| 2011/0227661 A1 | 9/2011 | Numata et al. |
| 2012/0179369 A1 | 7/2012 | Lapidot et al. |
| 2013/0135749 A1 | 5/2013 | Akutsu et al. |
| 2013/0229717 A1 | 9/2013 | Amitai et al. |
| 2013/0276960 A1 | 10/2013 | Amitai et al. |
| 2013/0279017 A1 | 10/2013 | Amitai et al. |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2015/0138451 A1 | 5/2015 | Amitai |
| 2015/0147028 A1 | 5/2015 | Copner |
| 2015/0182348 A1 | 7/2015 | Siegal et al. |
| 2015/0182748 A1 | 7/2015 | Gefen et al. |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0277127 A1 | 10/2015 | Amitai |
| 2015/0279254 A1 | 10/2015 | Zheng et al. |
| 2015/0293360 A1 | 10/2015 | Amitai |
| 2016/0116743 A1 | 4/2016 | Amitai |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0341964 A1 | 11/2016 | Amitai |
| 2016/0349518 A1 | 12/2016 | Amitai et al. |
| 2017/0023761 A1 | 1/2017 | Dural et al. |
| 2017/0045744 A1 | 2/2017 | Amitai |
| 2017/0052376 A1 | 2/2017 | Amitai |
| 2017/0052377 A1 | 2/2017 | Amitai |
| 2017/0336636 A1 | 11/2017 | Amitai et al. |
| 2017/0357095 A1 | 12/2017 | Amitai |
| 2017/0363799 A1 | 12/2017 | Ofir et al. |
| 2018/0039082 A1 | 2/2018 | Amitai |
| 2018/0067315 A1 | 3/2018 | Amitai et al. |
| 2018/0157057 A1 | 6/2018 | Gelberg et al. |
| 2018/0210202 A1 | 7/2018 | Danziger |
| 2018/0267317 A1 | 9/2018 | Amitai |
| 2018/0275384 A1 | 9/2018 | Danziger et al. |
| 2018/0292592 A1 | 10/2018 | Danziger |
| 2018/0292599 A1 | 10/2018 | Ofir et al. |
| 2018/0373039 A1 | 12/2018 | Amitai |
| 2019/0011710 A1 | 1/2019 | Amitai |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0212562 A1* | 7/2019 | Matsuki ............ G02B 6/0055 |
| 2019/0227215 A1 | 7/2019 | Danziger et al. |
| 2019/0293856 A1 | 9/2019 | Danziger |
| 2019/0339530 A1 | 11/2019 | Amitai |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0200963 A1 | 6/2020 | Eisenfeld et al. |
| 2020/0209667 A1 | 7/2020 | Sharlin et al. |
| 2020/0241308 A1 | 7/2020 | Danziger et al. |
| 2020/0249389 A1* | 8/2020 | Li ..................... G02B 6/005 |
| 2020/0249481 A1 | 8/2020 | Danziger et al. |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292819 A1* | 9/2020 | Danziger .......... G02B 6/0018 |

* cited by examiner

Figure 3A
Figure 3B
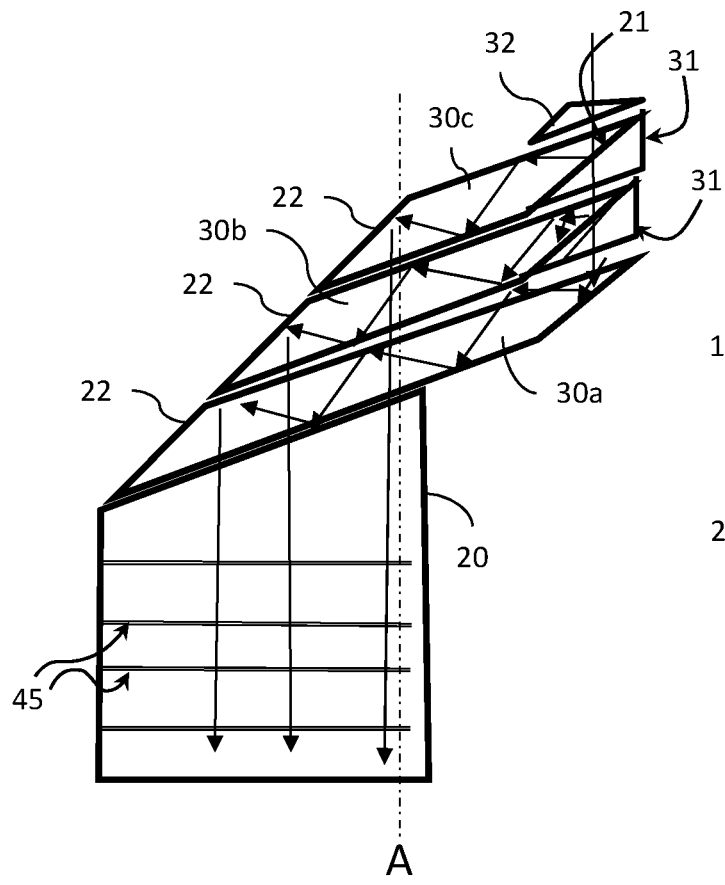
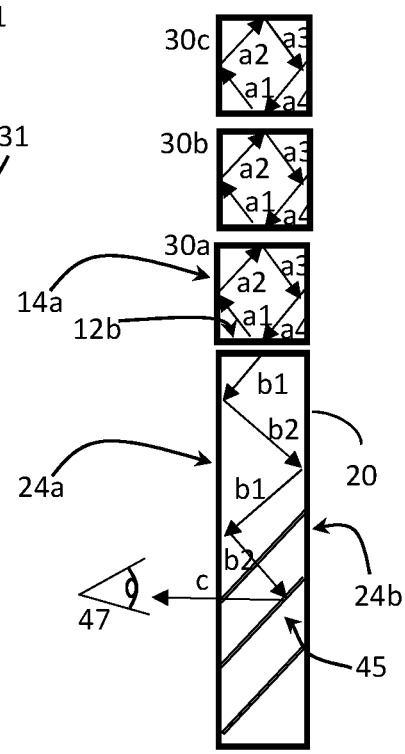
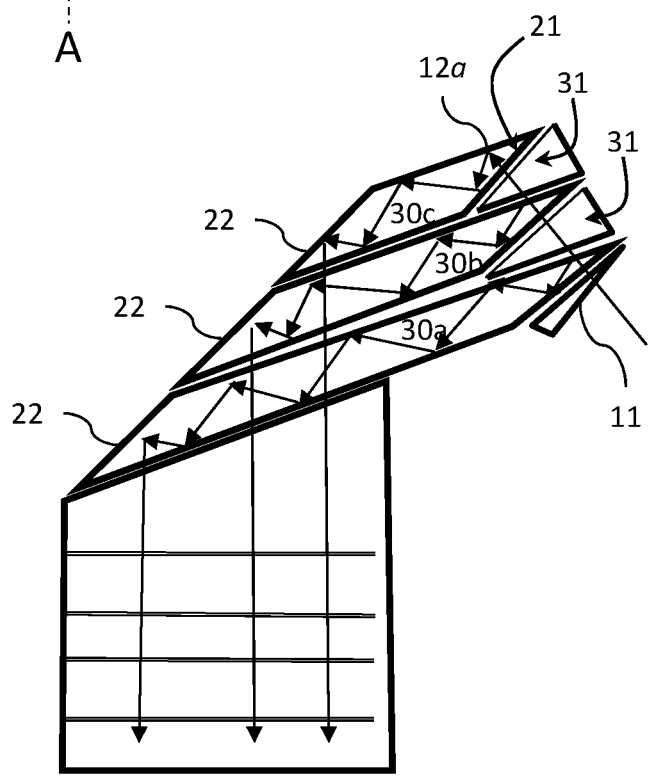
Figure 4

Figure 6A
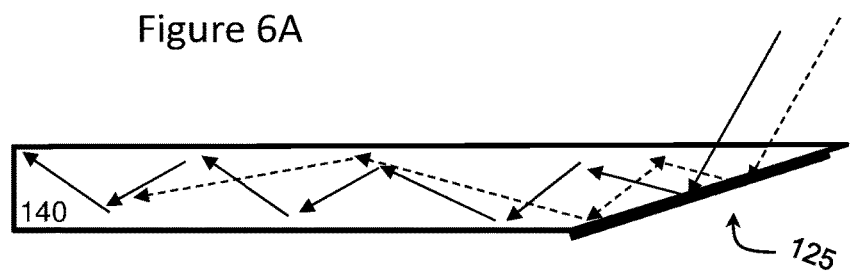
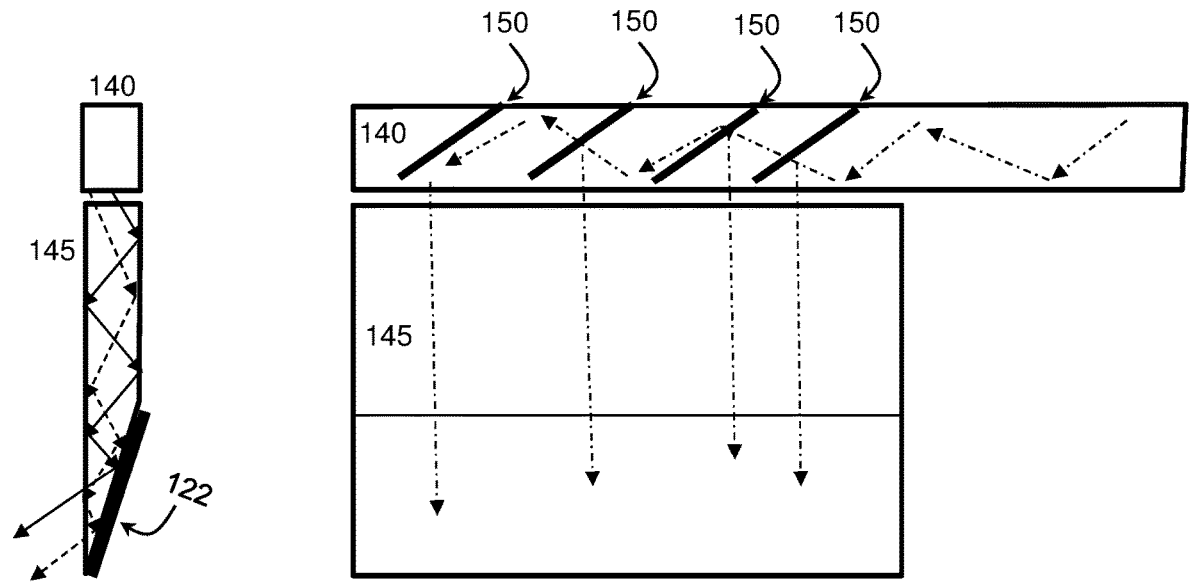
Figure 6B    Figure 6C

Figure 8A
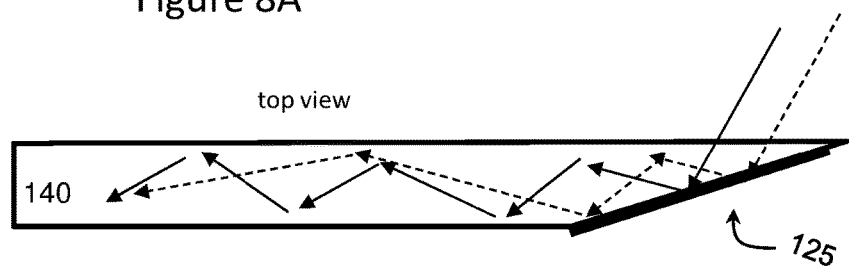
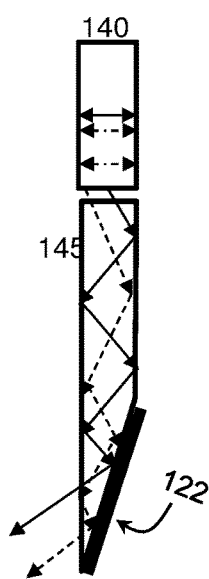
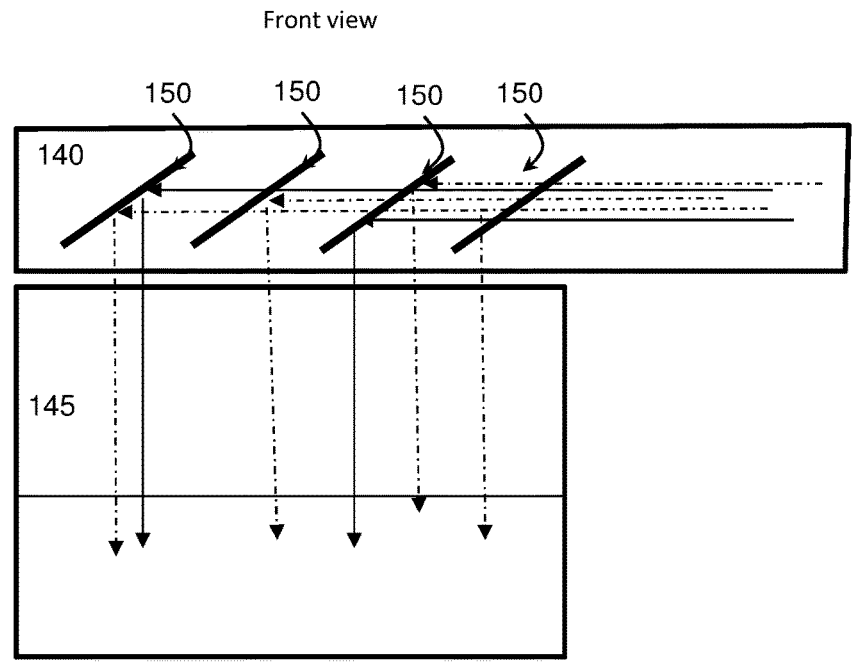
Figure 8B
Figure 8C

OPTICAL APERTURE EXPANSION ARRANGEMENT FOR NEAR-EYE DISPLAYS

FIELD AND BACKGROUND OF THE INVENTION

The present invention relates to near-eye displays and, in particular, it concerns an optical aperture expansion arrangement for near-eye displays.

Certain near-eye displays are based on a waveguide used to expand the aperture from a small projector to a larger aperture for display to the eye of the observer. The waveguide includes an output coupling mechanism to transmit the light from the waveguide towards the eye.

Aperture expansion is typically subdivided into two stages, expanding sequentially along two dimensions. The second dimension, providing an output to the eye, may be based on a waveguide, incorporating internal facets, as commercially available from Lumus Ltd. (Israel), or may employ a waveguide incorporating diffractive optical elements for coupling-out of an image.

Various arrangements may be used for providing the first dimension of aperture expansion. One example is described in PCT patent publication WO 2017/141242 (hereafter "the '242 publication") in which coupling in and coupling out are achieved by wedge configurations at the ends of a waveguide, forming a parallelogram structure as viewed from the side.

SUMMARY OF THE INVENTION

The present invention is an optical device providing aperture expansion particularly useful in near-eye displays.

According to the teachings of an embodiment of the present invention there is provided, an optical device comprising: a first optical waveguide having a direction of elongation, the first optical waveguide having first and second pairs of parallel faces parallel to the direction of elongation forming a rectangular cross-section for guiding light by four-fold internal reflection at the first and second pairs of parallel faces, each ray that undergoes internal reflection thereby defining a set of four conjugate propagation directions, at least part of the first optical waveguide being bounded by first and second wedge-forming surfaces, the first wedge-forming surface being configured such that rays corresponding to at least part of an injected image propagating within the first optical waveguide in a first direction from a first set of conjugate propagation directions are deflected by reflection at the first wedge-forming surface so as to propagate in a second direction from a second set of conjugate propagation directions, the second direction being at a smaller angle to the direction of elongation than the first direction, and wherein the second wedge-forming surface is parallel to the first wedge-forming surface so as to deflect an image propagating in at least one direction from the second set of conjugate directions so as to propagate in at least one direction from the first set of conjugate directions, and to couple-out an image propagating along one direction from the first set of conjugate directions so as to exit from the first optical waveguide.

According to a further feature of an embodiment of the present invention, the first wedge-forming surface is an external surface of the first optical waveguide.

According to a further feature of an embodiment of the present invention, the first wedge-forming surface is coated with a reflective coating.

According to a further feature of an embodiment of the present invention, the first wedge-forming surface is coated with a partially reflective coating.

According to a further feature of an embodiment of the present invention, the first wedge-forming surface is transparent, and wherein at least a part of the parallel faces in facing relation with the first wedge-forming surface is coated with a reflective coating.

According to a further feature of an embodiment of the present invention, an injected image introduced into the first optical waveguide is deflected from an injection direction to a direction from the first set of conjugate directions by a first reflection in the first wedge-forming surface, and is further deflected, after additional reflection from at least one of the parallel faces, from a direction from the first set of conjugate directions to a direction from the second set of conjugate directions by a second reflection from the first wedge-forming surface.

According to a further feature of an embodiment of the present invention, there is also provided a coupling-in prism adjacent to, or contiguous with, a coupling-in region of the first waveguide, the coupling-in prism comprising at least one surface that forms an extension of a corresponding surface of the first waveguide.

According to a further feature of an embodiment of the present invention, there is also provided a light guide having a two major parallel surfaces, wherein the first waveguide is deployed so that an image coupled out of the first waveguide is coupled in to the light guide so as to propagate within the light guide by internal reflection at the two major parallel surfaces, the light guide further comprising a coupling-out arrangement for coupling out the image propagating within the light guide so as to direct the image towards an eye of a user.

According to a further feature of an embodiment of the present invention, there is also provided a second optical waveguide having first and second pairs of parallel faces parallel to the direction of elongation forming a rectangular cross-section for guiding light by four-fold internal reflection at the first and second pairs of parallel faces, at least part of the second optical waveguide being bounded by first and second wedge-forming surfaces, the first and the second optical waveguides being deployed in a stacked relation and configured such that a projected image with a first aperture size is partially coupled-in to each of the first and second optical waveguides, and such that the second wedge-forming surfaces of the first and second optical waveguides each for part of a coupling-out configuration, the coupling-out configurations being deployed so as to provide an effective output aperture having a size greater than the first aperture size.

According to a further feature of an embodiment of the present invention, for each of the first and second optical waveguides, the first wedge-forming surface and a part of one of the parallel faces in facing relation with the first wedge-forming surface form a coupling-in configuration, the optical device further comprising a filling prism substantially filling a wedge-shaped gap between the coupling-in configurations.

According to a further feature of an embodiment of the present invention, the first wedge-forming surface of the second optical waveguide is coated so as to be partially reflective, thereby coupling-in a part of the projected image and allowing part of the projected image to reach the first coupling-in configuration.

According to a further feature of an embodiment of the present invention, the part of one of the parallel faces in facing relation with the first wedge-forming surface of the first optical waveguide is coated so as to be partially reflective, thereby coupling-in a part of the projected image and allowing part of the projected image to reach the second coupling-in configuration.

According to a further feature of an embodiment of the present invention, the first and second optical waveguides are part of a stack of at least three optical waveguides.

According to a further feature of an embodiment of the present invention, the image coupled out from the second optical waveguide propagates across the first optical waveguide.

According to a further feature of an embodiment of the present invention, the first and second wedge-forming surfaces of the first optical waveguide are inclined at oblique angle to the first pair of parallel faces and are perpendicular to the second pair of parallel faces.

According to a further feature of an embodiment of the present invention, the first and second wedge-forming surfaces of the first optical waveguide are inclined at oblique angle to both the first pair of parallel faces and the second pair of parallel faces.

There is also provided according to the teachings of an embodiment of the present invention, an optical device comprising: a first optical waveguide portion having at least a first pair of parallel faces for guiding light by internal reflection, the first optical waveguide including a plurality of mutually-parallel partially reflective surfaces oriented non-parallel to the pair of parallel faces, a wedge configuration formed between a first wedge-forming surface and one of the parallel surfaces, the wedge configuration being configured such that rays corresponding to at least part of an injected image propagating within the first optical waveguide portion in a first direction are deflected by reflection at the first wedge-forming surface so as to propagate in a second direction at a smaller angle to a direction of elongation of the first optical waveguide portion than the first direction, rays in the first and the second directions being deflected at the partially reflected surfaces into a first deflected direction and a second deflected direction, respectively, for coupling out of the first optical waveguide portion, a second optical waveguide portion having a second pair of parallel faces for guiding light by internal reflection, the second optical waveguide portion being deployed for receiving part of the injected image propagating in the first deflected direction and the second deflected direction, the second optical waveguide portion comprising a coupling-out wedge configuration formed between a second wedge-forming surface and one of the second pair of parallel faces, the coupling-out wedge configuration being deployed for coupling out at least a part of the image propagating in the first deflected direction by a single reflection from the wedge-forming surface, and in the second deflected direction by being twice reflected from the wedge-forming surface.

BRIEF DESCRIPTION OF THE DRAWINGS

The invention is herein described, by way of example only, with reference to the accompanying drawings, wherein:

FIG. 1A is a schematic front view of an optical device, constructed and operative according to an embodiment of the present invention, including a waveguide;

FIG. 1B is a schematic front view of an optical device similar to that of FIG. 1A illustrating an alternative configuration for coupling in a projected image;

FIG. 3A is a front view of an optical device employing a stack of waveguides similar to FIG. 1A;

FIG. 3B is a cross-sectional view taken along the line A of FIG. 3A;

FIG. 4 is a front view similar to FIG. 3A illustrating an alternative coupling in configuration similar to FIG. 1B;

FIGS. 6A-6C are schematic top, side and front views, respectively, of a device for achieving two-dimensional optical aperture expansion according to a further aspect of the present invention;

FIGS. 8A-8C are schematic top, side and front views, respectively, of a device similar to that of FIGS. 6A-6C implemented using two slab-type waveguides.

DESCRIPTION OF THE PREFERRED EMBODIMENTS

Figure 1C:
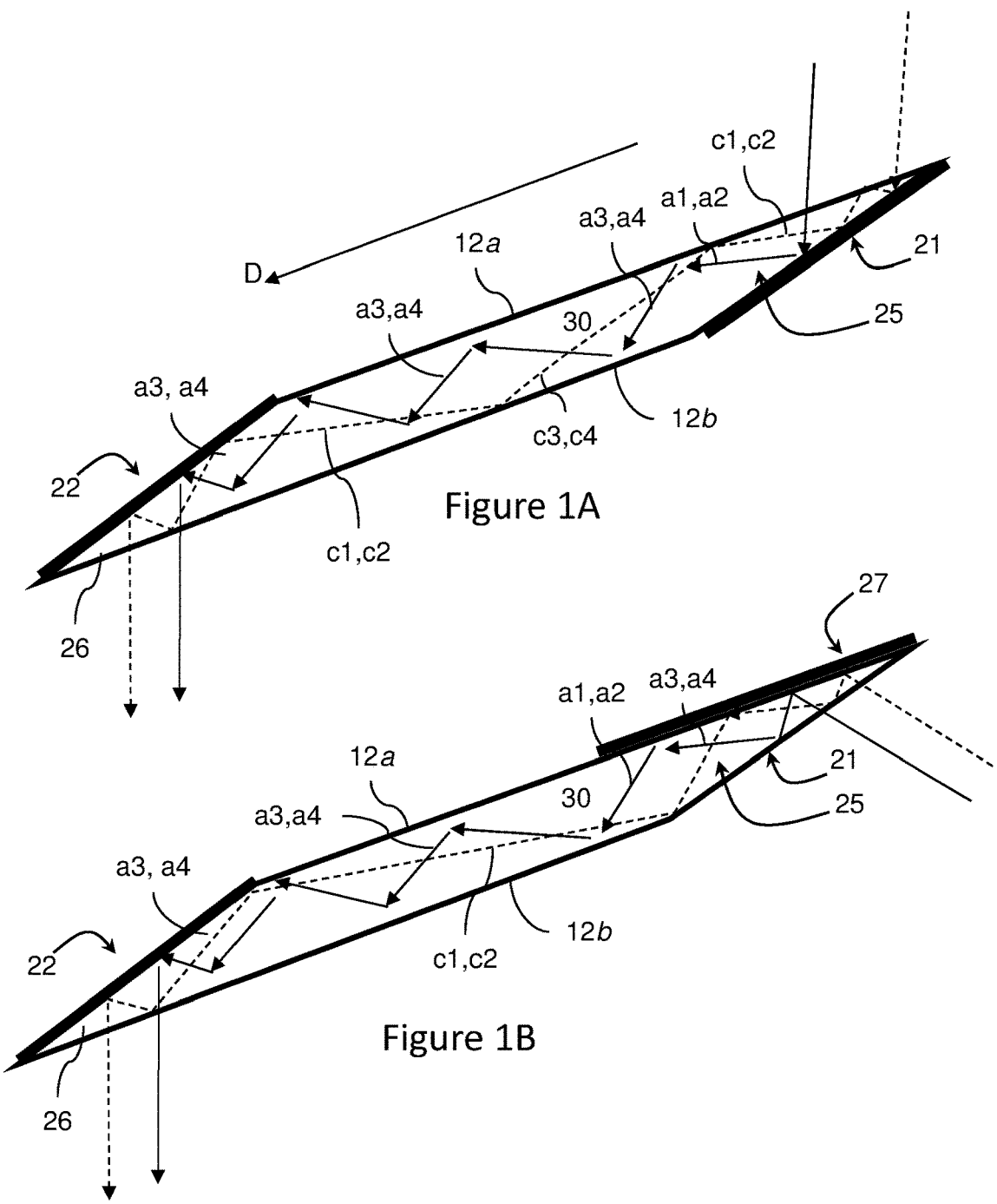
FIG. 1C is a schematic cross-sectional view taken through the waveguide of FIG. 1A, shown twice in order to show two different modes of image propagation.
Figure 1C:
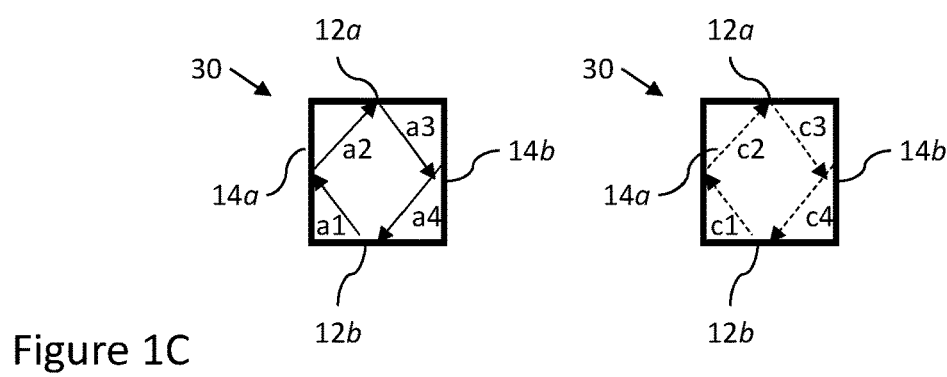
Figure 2A:
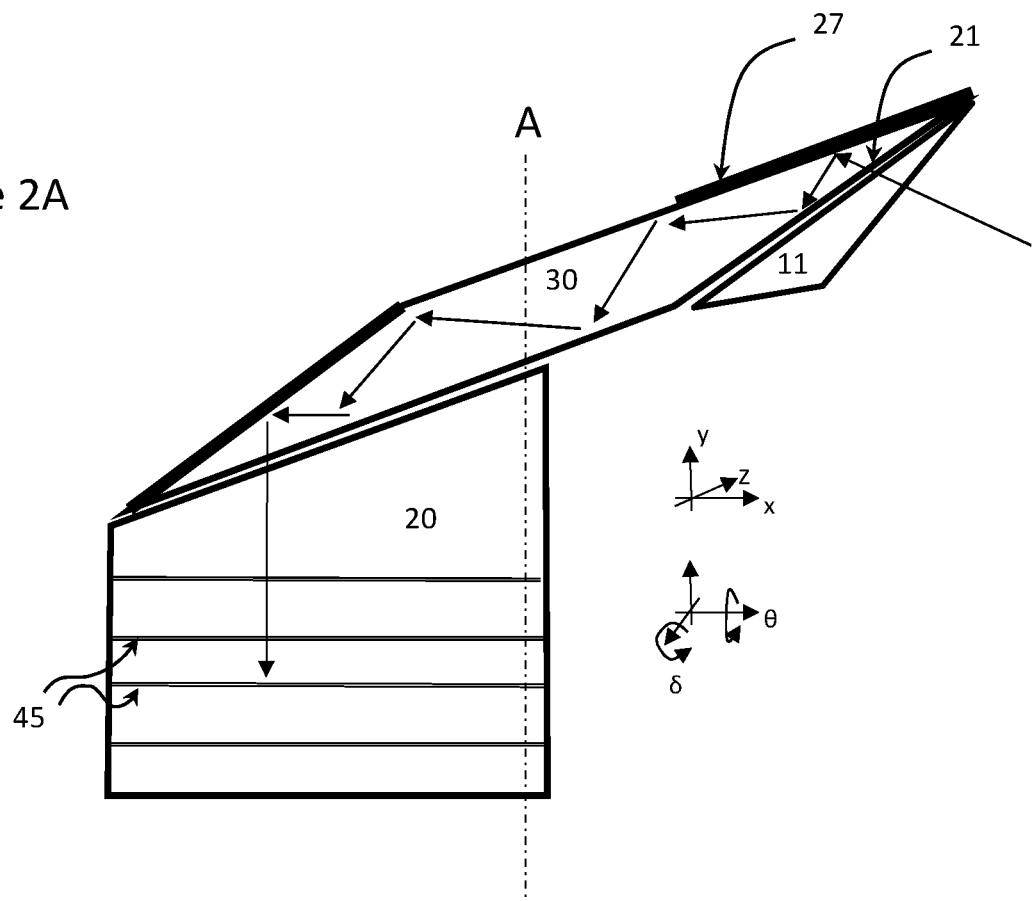
FIG. 2A is a front view of an optical device employing the waveguide of FIG. 1B together with a second waveguide.
Figure 2B:
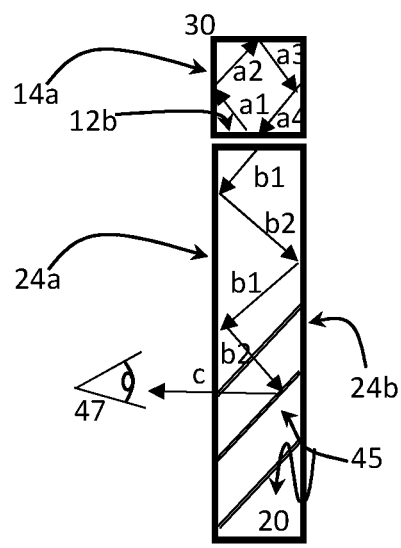
FIG. 2B is a cross-sectional view taken along the line A of FIG. 2A.

The present invention is an optical device providing aperture expansion particularly useful in near-eye displays.

The principles and operation of optical devices according to the present invention may be better understood with reference to the drawings and the accompanying description.

Referring now to the drawings, FIGS. 1A-5B illustrate various implementations of an optical device, constructed and operative according to a first subset of non-limiting embodiments of the present invention, providing aperture expansion particularly useful in near-eye displays.

In general terms, the optical device includes a first optical waveguide 30 having a direction of elongation D. Optical waveguide 30 has first and second pairs of parallel faces 12a, 12b and 14a, 14b, parallel to the direction of elongation D, forming a rectangular cross-section, for guiding light by four-fold internal reflection at the first and second pairs of parallel faces 12a, 12b and 14a, 14b. "Rectangular" in this context includes as a special case a square cross-section. As a result of this four-fold internal reflection, each ray that undergoes internal reflection thus defines a set of four conjugate propagation directions, illustrated for example as rays a1, a2, a3 and a4 in FIG. 1C.

According to one aspect of the present invention, at least part of optical waveguide 30 is bounded by first and second wedge-forming surfaces 21 and 22 which, together with adjacent regions of one or more of the parallel faces, form corresponding wedge configurations 25 and 26, respectively.

First wedge-forming surface 21 is preferably configured such that rays a3, a4 corresponding to at least part of an injected image propagating within the first optical waveguide in a first direction a3 or a4 from a first set of conjugate propagation directions a1-a4 are deflected by reflection at the first wedge-forming surface 21 so as to propagate in a second direction c1 or c2 from a second set of conjugate propagation directions c1-c4, the second direction being at a smaller angle to the direction of elongation than the first direction. In other words, after an image is already coupled in to waveguide 30 as a first set of conjugate directions a1-a4, a further reflection in wedge-forming surface 21 deflects the image propagation direction to an additional set of conjugate directions c1-c4 that impinge of the parallel surfaces at shallower angles of incidence. The image propagating in the first set of conjugate directions a1-a4 may itself be coupled in by a first reflection from wedge-forming surface 21, as illustrated in FIGS. 1A and 1B. Thus, in the example of FIG. 1, rays of the input projected image enter the first wedge configuration 25 via one of the parallel surfaces 12a and are then reflected once from wedge-forming surface 21 to generate a once-deflected rays corresponding to rays a1 or a2 (which interchange between each other by reflection at side faces 14a and 14b). These rays reflect at face 12a to form conjugate rays a3 and a4. For part of the aperture, represented by the solid arrows, the next boundary reached by rays a3 and a4 is face 12b beyond the end of the wedge-forming surface. As a result, this part of the injected image propagates by four-fold internal reflection, interchanging through rays a1-a4 as illustrated in FIG. 1C (left), as it passes along the waveguide portion. For another part of the aperture, the rays a3 and a4 fall again on wedge-forming surface 21, causing a further deflection to generate rays c1 and/or c2, and propagating along the waveguide by four-fold internal reflection of conjugate rays c1-c4, as represented in FIG. 1C (right). Rays c1-c4 are at a smaller angle to the extensional direction D of the waveguide than rays a1-a4, but this distinction is not visible in the axial view of FIG. 1C.

Parenthetically, wherever an image is represented herein by a light beam or ray, it should be noted that the beam is a sample beam of the image, which typically is formed by multiple beams at slightly differing angles each corresponding to a point or pixel of the image. Except where specifically referred to as an extremity of the image, the beams illustrated are typically a centroid of the image. Additionally, the illumination for each pixel is not limited to a particular ray position, but instead is preferably a wide beam of parallel rays which essentially "fills" the corresponding dimension of the waveguide. Thus, the sample rays illustrated herein are typically part of a wider continuum of rays spanning an output aperture of an image projection device.

The inclination angle of wedge-forming surface 21 to face 12a is preferably chosen to satisfy a number of geometrical requirements. Firstly, taking into consideration the intended direction of injection of a projected image, the wedge angle is chosen to be such that the once-reflected rays a1, a2 undergo internal reflection at the parallel faces of the waveguide, for the entire field of view of the image. Additionally, the wedge angle is chosen to be sufficiently shallow that the above-described repeat reflection from the wedge-forming surface to generate rays c1, c2 can occur, while ensuring that the fields of view of the image in the one-deflected and twice-deflected images do not overlap in angular space. Examples of how to evaluate these conditions numerically in the case of two-fold reflection appear in the aforementioned '242 publication, and can readily be adapted to the case of the four-fold reflection of the present invention, as will be clear to one ordinarily skilled in the art. The invention is not limited to two modes of propagation and, particularly where only a relatively small angular field of view is required, it may be possible to use also a third propagation and its conjugates, achieved after one of the rays c1-c4 is further reflected at the wedge-forming surface.

The second wedge-forming surface 22 is in this case parallel to first wedge-forming surface 21, forming a second wedge configuration 26 which couples out the image illumination propagating within the waveguide portion in a manner analogous to the coupling in described above. Specifically, second wedge-forming surface 22 deflects an image propagating in at least one direction from the second set of conjugate directions c1-c4 so as to propagate in at least one direction from the first set of conjugate directions a1-a4, and further couples out an image propagating along one direction from the first set of conjugate directions a1-a4 so as to exit from optical waveguide 30.

The configuration of FIG. 1A in side view appears similar to that described in the aforementioned '242 publication. The '242 publication, however, relates to a waveguide in which reflection occurs at only one pair of parallel surfaces (i.e., two-fold reflection), and the other dimension of the waveguide (into the page as illustrated) is relatively large, to avoid intersection of light with the other extremities of the waveguide. In contrast, certain preferred embodiments of the present invention adopt a rectangular waveguide approach, providing guiding of the image illumination in two dimensions by four-fold internal reflection, and thereby allowing use of much more compact optical elements than could be used by the slab-type waveguide approach.

Although the wedge-forming surfaces 21 and 22 are shown here at an oblique angle to one pair of parallel faces 12a, 12b and perpendicular to the other pair of parallel faces 14a, 14b, the rectangular waveguide approach also allows the use of a wedge-forming surface which is inclined obliquely relative to both pairs of parallel faces. One such example will be illustrated below with reference to FIG. 5A. In general, so long as the wedge geometry is similar for the first and second wedge configurations, the coupling out geometry is still effective to "undo" the effects of the coupling in geometry.

In the configuration of FIG. 1A, depending on the angle of injection of the projected image and the angle of the wedge itself, wedge-forming surface 21 may in some cases achieve sufficient internal reflection without requiring a coating. In most cases, however, it is preferable to provide wedge-forming surface 21 with a reflective coating, or in certain cases discussed further below, a partially reflective coating. Second wedge-forming surface 22 is preferably provided with a reflective coating. The reflective coatings, represented here by a thickened line, may be implemented using metallic coatings or dielectric coatings, as is known in the art.

FIG. 1B illustrates an alternative coupling-in geometry which may be advantageous in certain implementations in order to achieve a more compact overall product form factor. In this case, first wedge-forming surface 21 is a transparent external surface of optical waveguide 30, and is the surface through which an injected image is directed. At least a part of the face 12a that is in facing relation with first wedge-forming surface 21 is coated with a (fully or partially) reflective coating 27, thereby reflecting all, or part, of an injected image back towards wedge-forming surface 21 where the rays undergo reflection, equivalent to the first reflection in the configuration of FIG. 1. The rest of the reflections are analogous to what was described above in relation to FIG. 1A.

The coupling-in configuration of FIG. 1B is believed to be advantageous in a wide range of applications, including variants which employ a waveguide which is large in the other dimension so as to accommodate the entire field of view of an image with only two-fold reflection in waveguide 30, i.e., that are otherwise similar to the structured described in the above-mentioned '242 publication.

FIG. 2 illustrates an implementation of a near eye display in which waveguide 30 is used to deliver an image into a second waveguide (or "light guide") 20 having a two major parallel surfaces 24a, 24b, from which the image (propagating as rays b1 and b2) is coupled out towards the eye 47 of the observer. In the particularly preferred but non-limiting example illustrated here, the second waveguide employs a plurality of mutually-parallel, obliquely inclined, internal, partially-reflecting surfaces 45 for coupling out the image towards the eye. Light guide 20 with internal partially-reflecting surfaces 45 may readily be implemented using design and manufacturing techniques well known in the art, with similar elements being commercially available from a range of sources including Lumus Ltd. (Ness Ziona, Israel). As such, the structure of light guide 20 per se will not be described here in detail.

In the device design shown here, waveguide 30 is tilted relative to the extensional direction of the partially-reflecting surfaces 45 within waveguide 20 in order to generate perpendicular propagation within waveguide 20. In certain cases, it may be desirable to employ other angles of offset between the two waveguides, such as an inclination about a "roll" axis along the direction of elongation of waveguide 30, to provide a modified optical coupling configuration between the two waveguides. Various variant coupling options that may also be employed here are described in PCT Patent Application Publication No. WO 2018/065975 A1 (which was published after the priority date of this application and does not constitute prior art thereto), particularly in FIGS. 19-26, and for brevity will not be addressed here.

This example employs the coupling in geometry described above with reference to FIG. 1B. A coupling-in prism 11 is added in order to minimize chromatic aberration. An air gap, or other low-index coupling material, is provided between coupling-in prism 11 and the wedge-forming surface 21 in order to maintain total internal reflection properties at the wedge-forming surface 21.

Turning now to FIGS. 3A-4, these illustrate how a stack of two or more waveguides can be used to achieve more extensive aperture expansion. In these illustrations, a stack of three waveguides 30a, 30b, 30c, each similar to waveguide 30 described thus far, are arranged so that a projected input image is partially coupled into each of the waveguides. The waveguides differ in length so that the coupling-out wedge configurations are staggered, most preferably with wedge-forming surfaces 22 roughly coplanar as illustrated, thereby providing coverage for the entire "width" dimension of the light guide 20, which itself provides the second dimension of aperture expansion, as in FIGS. 2A-2B above. An air gap or other internal-reflection-preserving layer or multi-layered structure is placed between waveguides 30a, 30b and 30c so as to preserve their internal reflection properties. At least in the area of coupling out, the boundary between the waveguides must be transparent to low-angle rays, to allow the coupled-out rays to pass through the interface. In other areas, a metallic or other reflective layer could be used between the waveguides.

As seen in FIG. 3B, the coupling out from the wedge-forming surface 22 of upper waveguides 30b and 30c directs the out-coupled image illumination (rays b1 and/or b2) through the underlying waveguide(s), where the front and back faces 14a and 14b serve as an extension of the light guide 20 in the front-back direction. In the cross-sectional view of FIG. 3A, the rays b1-b2 and c1-c4 have been omitted from the upper waveguides for clarity of presentation, but they would be present there.

The coupling-in configuration of the device of FIG. 3B is based on partial reflection from wedge-forming surfaces 21. Specifically, the wedge-forming surface 21 of waveguides 30c and 30b are coated so as to be partially reflective, such that when a projected image is input as shown, part of the image illumination is deflected and coupled into waveguide 30c, part is transmitted and coupled into waveguide 30b, and part is transmitted through both and is coupled into waveguide 30a. The wedge-forming surface 21 of waveguide 30a can be a full (i.e., near 100%) reflector. In order to minimize distortions in the transmitted part of the image illumination, filling prisms 31 are preferably deployed so as to substantially fill the wedge-shaped gaps between the coupling-in configurations. Filling prisms 31 may be integrated as an extension to the waveguide, and may be separated from the waveguide below by an air gap as shown. In some cases, a coupling-in prism 32 may be provided, for example, to facilitate the coupling in geometry and minimize chromatic aberration.

FIG. 4 illustrates a device architecture similar to FIG. 3B, but employing a coupling-in arrangement based on the principles of FIG. 1B. In this case, partial coupling into the multiple waveguides is achieved by a partially reflective coating applied to part of the face 12a, and the image is introduced from the side of wedge-forming surfaces 21. The uppermost waveguide 30c may employ a fully reflective coating on the relevant part of face 12a. Filling wedges 31 are again provided, but are here shown spaced by an air gap from wedge-forming surfaces 21 in order to maintain TIR properties of surface 21, providing low-loss transmission of the injected image illumination while trapping the reflected rays. Coupling-in prism 11 is provided.

Figure 5A:
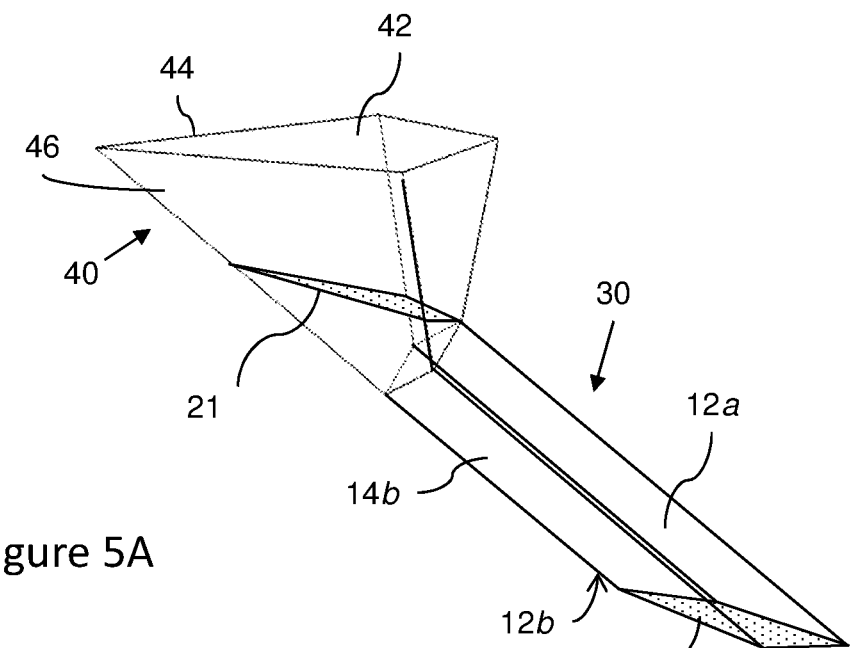
FIGS. 5A and 5B are schematic isometric views illustrating a waveguide according to the teachings of the present invention with a coupling-in prism, the waveguides employing wedge-forming surfaces with oblique inclination to both sets, and only one of the sets, of parallel faces of the waveguide, respectively.
Figure 5B:
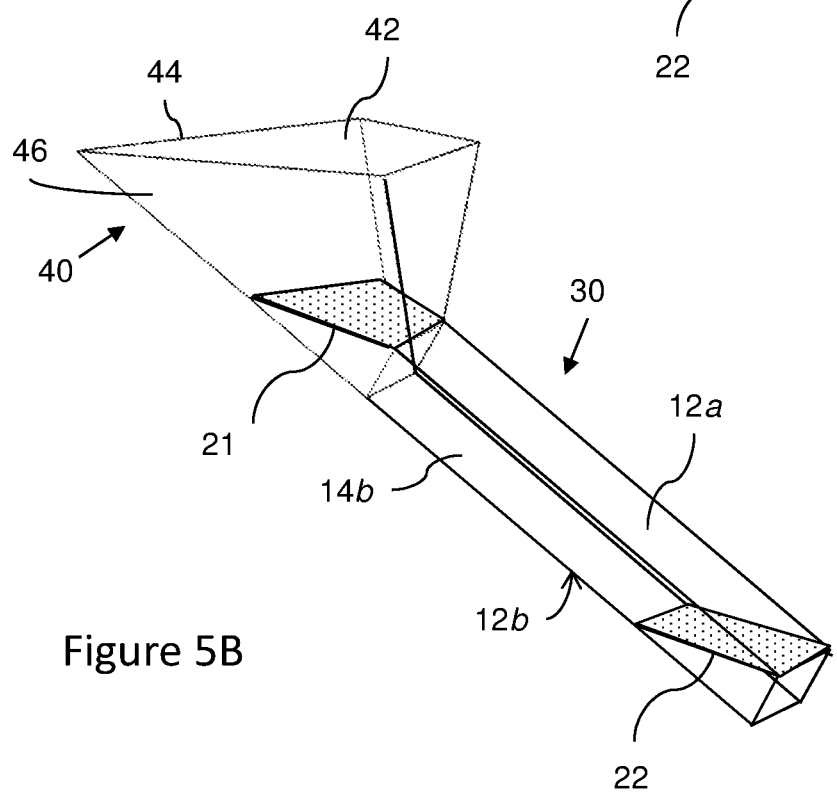

While the implementations of the invention illustrated thus far have employed a first reflection from the first wedge-forming surface 21 for coupling in of image illumination into the waveguide (to the mode of rays a1-a4), this is not a necessary feature, and alternative coupling-in arrangements may be preferred. By way of example, FIGS. 5A and 5B illustrate coupling-in arrangements in which a coupling-in prism 40 is adjacent to, or contiguous with, a coupling-in region of first waveguide 30, so as to provide an inclined input surface 42 correctly oriented to allow direct injection of an image along an image injection direction corresponding to one of the rays a1-a4, with the remaining three conjugate rays being generated by the internal reflections from the waveguide faces. One of those conjugate rays reflects from wedge-forming surface 21 to generate one of the second mode rays c1-c4, with the other three conjugate rays being again generated by the internal reflections within the waveguide.

Coupling-in prism 40 preferably includes at least one surface, and preferably two surfaces, 44 and 46, which are coplanar extensions of corresponding surfaces of the first waveguide, which may be faces 12b and 14b as shown, or may in some cases include the wedge-forming surface 21. These extension surfaces facilitate "filling" the waveguide with the image illumination. In this implementation, the first mode of propagation, corresponding to rays a1-a4, is injected directly (by injecting one of those images) into the waveguide, while the second mode, corresponding to rays c1-c4, is formed by reflection of one of those images in wedge-forming surface 21 followed by generating the conjugate images by internal reflection.

The implementations of FIGS. 5A and 5B are essentially similar, except that FIG. 5A illustrates an implementation in which wedge-forming surfaces 21 and 22 are inclined at oblique angle to both the first pair of parallel faces 12a, 12b and the second pair of parallel faces 14a, 14b, whereas FIG. 5B illustrates an implementation in which wedge-forming surfaces 21 and 22 are inclined at oblique angle to the first pair of parallel faces 12a, 12b and are perpendicular to the second pair of parallel faces 14a, 14b.

Turning now to FIGS. 6A-8C, these illustrate a second aspect of the present invention according to which the first and second wedge-forming surfaces are not parallel surfaces, since the image illumination is deflected between the first and second wedge configurations. In the cases illustrated here, the deflection occurs at a series of partially reflective inclined internal surfaces within a first waveguide portion, which achieve a first dimension of aperture expansion, and which redirect the image illumination towards a second waveguide portion.

Three non-limiting examples of such an implementation will now be described. In each case, there is shown an optical device including a first optical waveguide portion 140 having at least one pair of parallel faces for guiding light by internal reflection. Optical waveguide portion 140 includes a sequence of mutually-parallel partially reflective surfaces 150 oriented non-parallel to the pair of parallel faces. Optical waveguide portion 140 also includes a wedge configuration formed between a first wedge-forming surface 125 and one of the parallel surfaces. The wedge configuration is configured to provide coupling in of image illumination to generate two different modes (or ranges of angles) for propagation of the image within the waveguide, as described in relation to wedge-forming surface 21 in the previous embodiments. In this case, instead of propagating directly to a coupling-out wedge, the rays corresponding to the two propagation modes of the image are deflected at the partially reflected surfaces 150 into corresponding deflected directions for coupling out of the first optical waveguide portion.

A second optical waveguide portion 145 has a pair of parallel faces for guiding light by internal reflection, and is deployed for receiving part of the injected image propagating in directions corresponding to the two modes of image propagation as deflected from surfaces 150. Second optical waveguide portion 145 includes a coupling-out wedge configuration formed between a second wedge-forming surface 122 and one of the parallel faces. This coupling-out wedge configuration couples out the two modes of image propagation in a manner fully analogous to wedge-forming surface 22 described above. Where used as part of an augmented reality display, wedge-forming surface 122 is preferably implemented with a partially reflective coating, and a complementary wedge prism (not shown) may be added in order to provide a non-distorted view of the real world via the wedge configuration.

In the cases of FIGS. 6A-6C and 7A-7C, first optical waveguide portion 140 is a rectangular waveguide within which the image illumination propagates by four-fold internal reflection, as described in relation to waveguide 30 above. In FIGS. 6A-6C, the coupling-in wedge configuration is best seen in the top view of FIG. 6A, while the coupling-out wedge configuration is best seen in the side view of FIG. 6B. An alternative implementation using coupling-in via the wedge-forming surface 125, analogous to FIG. 1B described above, may also be used. The orientation of the partially reflective surfaces 150 is here most preferably oblique to the top and bottom surfaces of waveguide 140 and perpendicular to the front and back surfaces as viewed in FIG. 8C.

Figure 7A:
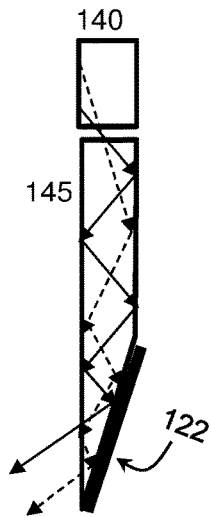
FIGS. 7A and 7B are schematic side and front views, respectively, of a modified implementation of the device of FIGS. 6A-6C employing an alternative coupling-in geometry.
Figure 7B:
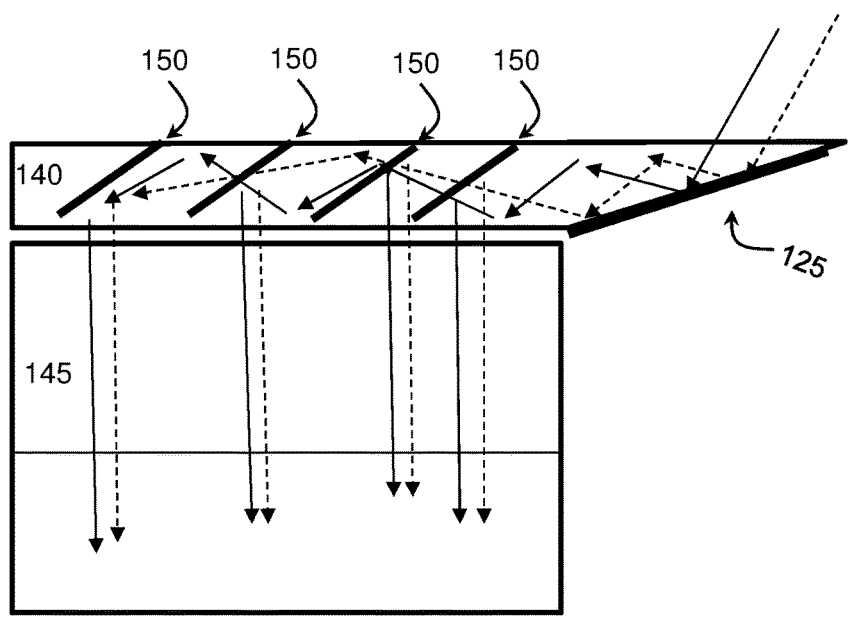

The embodiment of FIGS. 7A and 7B is structurally and functionally similar to that of FIGS. 6A-6C, but employs a different orientation of the coupling-in wedge, which may provide additional flexibility in product design compactness and ergonomics. Given the four-fold reflection occurring during propagation of the images within the waveguide, it is possible in some cases to select a desired orientation of conjugate image for coupling out to the eye. Where the coupled-out images are inverted images, this can be compensated for electronically by inverting the generated image so that the coupled-out image is correctly oriented. In a general case, partially reflective surfaces 150 are oblique to both pairs of parallel outer faces of the waveguide.

Turning finally to FIGS. 8A-8C, these illustrate an embodiment similar to that of FIGS. 6A-6C, but where the first waveguide portion 140 is a slab-type waveguide which guides the image illumination in only one dimension, between one pair of parallel faces. In the other dimension (up-down as viewed in FIGS. 8B and 8C), the image projected within waveguide portion 140 spreads out according to its angular field of view, and should not reach the extremities of the waveguide portion. Accordingly, waveguide portion 140 typically needs to be somewhat larger in the non-guided dimension than the previous implementations. Since no internal reflection is required (or desired) between waveguide portions 140 and 145, these elements may optionally be unified, or optically joined, into a single waveguide slab, without any air gap or other optical element interposed. In all other respects, the structure and operation of the embodiment of FIGS. 8A-8C is similar to that of FIGS. 6A-6C described above.

In all of the above embodiments, the devices described are used in combination with a number of additional components to form a complete product. Thus, for example, wherever rays are shown in the drawings relating to coupled-in image illumination, such rays are typically provided by a miniature image projector or "POD", which typically includes an illumination source, a spatial light modulator such as an LCoS chip, and collimating optics, typically all integrated into on surfaces of a beam splitter prism block structure. Such image projectors are per se well known and commercially available, and will not be described here in detail.

Similarly, in the case of a near-eye display, a final product is typically integrated with a support structure, which may include a glasses-frame type structure supported by the ears and nose of a wearer, or may include a head-mounted structure such as a head-band or helmet. All such structures are well known, and need not be described herein.

It will be appreciated that the above descriptions are intended only to serve as examples, and that many other embodiments are possible within the scope of the present invention as defined in the appended claims.

What is claimed is:
1. An optical device comprising:
a first optical waveguide having a direction of elongation, said first optical waveguide having first and second pairs of parallel faces parallel to said direction of elongation forming a rectangular cross-section for guiding light by four-fold internal reflection at said first and second pairs of parallel faces, each ray that undergoes internal reflection thereby defining a set of four conjugate propagation directions, at least part of said first optical waveguide being bounded by first and second wedge-forming surfaces, said first wedge-forming surface being configured such that rays corresponding to at least part of an injected image propagating within said first optical waveguide in a first direction from a first set of conjugate propagation directions are deflected by reflection at said first wedge-forming surface so as to propagate in a second direction from a second set of conjugate propagation directions, said second direction being at a smaller angle to said direction of elongation than said first direction, and wherein said second wedge-forming surface is parallel to said first wedge-forming surface so as to deflect an image propagating in at least one direction from said second set of conjugate directions so as to propagate in at least one direction from said first set of conjugate directions, and to couple-out an image propagating along one direction from said first set of conjugate directions so as to exit from said first optical waveguide.

2. The optical device of claim 1, wherein said first wedge-forming surface is an external surface of said first optical waveguide.

3. The optical device of claim 1, wherein said first wedge-forming surface is coated with a reflective coating.

4. The optical device of claim 1, wherein said first wedge-forming surface is coated with a partially reflective coating.

5. The optical device of claim 1, wherein said first wedge-forming surface is transparent, and wherein at least a part of said parallel faces in facing relation with said first wedge-forming surface is coated with a reflective coating.

6. The optical device of claim 1, wherein an injected image introduced into said first optical waveguide is deflected from an injection direction to a direction from said first set of conjugate directions by a first reflection in said first wedge-forming surface, and is further deflected, after additional reflection from at least one of said parallel faces, from a direction from said first set of conjugate directions to a direction from said second set of conjugate directions by a second reflection from said first wedge-forming surface.

7. The optical device of claim 1, further comprising a coupling-in prism adjacent to, or contiguous with, a coupling-in region of said first waveguide, said coupling-in prism comprising at least one surface that forms an extension of a corresponding surface of said first waveguide.

8. The optical device of claim 1, further comprising a light guide having a two major parallel surfaces, wherein said first waveguide is deployed so that an image coupled out of said first waveguide is coupled in to said light guide so as to propagate within said light guide by internal reflection at said two major parallel surfaces, said light guide further comprising a coupling-out arrangement for coupling out the image propagating within said light guide so as to direct the image towards an eye of a user.

9. The optical device of claim 1, further comprising a second optical waveguide having first and second pairs of parallel faces parallel to said direction of elongation forming a rectangular cross-section for guiding light by four-fold internal reflection at said first and second pairs of parallel faces, at least part of said second optical waveguide being bounded by first and second wedge-forming surfaces, said first and said second optical waveguides being deployed in a stacked relation and configured such that a projected image with a first aperture size is partially coupled-in to each of said first and second optical waveguides, and such that said second wedge-forming surfaces of said first and second optical waveguides each for part of a coupling-out configuration, said coupling-out configurations being deployed so as to provide an effective output aperture having a size greater than said first aperture size.

10. The optical device of claim 9, wherein, for each of said first and second optical waveguides, said first wedge-forming surface and a part of one of said parallel faces in facing relation with said first wedge-forming surface form a coupling-in configuration, the optical device further comprising a filling prism substantially filling a wedge-shaped gap between said coupling-in configurations.

11. The optical device of claim 10, wherein said first wedge-forming surface of said second optical waveguide is coated so as to be partially reflective, thereby coupling-in a part of said projected image and allowing part of said projected image to reach said first coupling-in configuration.

12. The optical device of claim 10, wherein said part of one of said parallel faces in facing relation with said first wedge-forming surface of said first optical waveguide is coated so as to be partially reflective, thereby coupling-in a part of said projected image and allowing part of said projected image to reach said second coupling-in configuration.

13. The optical device of claim 9, wherein said first and second optical waveguides are part of a stack of at least three optical waveguides.

14. The optical device of claim 9, wherein the image coupled out from said second optical waveguide propagates across said first optical waveguide.

15. The optical device of claim 1, wherein said first and second wedge-forming surfaces of said first optical waveguide are inclined at oblique angle to said first pair of parallel faces and are perpendicular to said second pair of parallel faces.

16. The optical device of claim 1, wherein said first and second wedge-forming surfaces of said first optical waveguide are inclined at oblique angle to both said first pair of parallel faces and said second pair of parallel faces.

17. An optical device comprising:
a first optical waveguide portion having at least a first pair of parallel faces for guiding light by internal reflection, said first optical waveguide including a plurality of mutually-parallel partially reflective surfaces oriented non-parallel to said pair of parallel faces, a wedge configuration formed between a first wedge-forming surface and one of said parallel surfaces, said wedge configuration being configured such that rays corresponding to at least part of an injected image propagating within said first optical waveguide portion in a first direction are deflected by reflection at said first wedge-forming surface so as to propagate in a second direction at a smaller angle to a direction of elongation of said first optical waveguide portion than said first direction, rays in said first and said second directions being deflected at said partially reflected surfaces into a first deflected direction and a second deflected direction, respectively, for coupling out of said first optical waveguide portion, a second optical waveguide portion having a second pair of parallel faces for guiding light by internal reflection, said second optical waveguide portion being deployed for receiving part of the injected image propagating in said first deflected direction and said second deflected direction, said second optical waveguide portion comprising a coupling-out wedge configuration formed between a second wedge-forming surface and one of said second pair of parallel faces, said coupling-out wedge configuration being deployed for coupling out at least a part of said image propagating in said first deflected direction by a single reflection from said wedge-forming surface, and in said second deflected direction by being twice reflected from said wedge-forming surface.

* * * * *